(12) United States Patent
Sugiyama et al.

(10) Patent No.: US 7,140,201 B2
(45) Date of Patent: Nov. 28, 2006

(54) METHOD FOR PRODUCING SILICA PARTICLES

(75) Inventors: Kunio Sugiyama, Tokyo (JP); Shuichi Tada, Tokyo (JP); Jinichi Omi, Tokyo (JP); Tadahiro Nakada, Tokyo (JP); Hiroshi Morita, Tokyo (JP); Masaki Kusuhara, Tokyo (JP); Hiroyuki Watanabe, Tokyo (JP); Hirofumi Uehara, Tokyo (JP); Keiko Sanpei, Tokyo (JP)

(73) Assignees: M. Watanabe & Co., Ltd., Tokyo (JP); Asahi Denka Kogyo Kabushiki Kaisha, Tokyo (JP)

( * ) Notice: Subject to any disclaimer, the term of this patent is extended or adjusted under 35 U.S.C. 154(b) by 517 days.

(21) Appl. No.: 10/169,191

(22) PCT Filed: Dec. 28, 2000

(86) PCT No.: PCT/JP00/09357

§ 371 (c)(1),
(2), (4) Date: Jun. 28, 2002

(87) PCT Pub. No.: WO01/47808

PCT Pub. Date: Jul. 5, 2001

(65) Prior Publication Data

US 2003/0005724 A1    Jan. 9, 2003

(30) Foreign Application Priority Data

Dec. 28, 1999  (JP) .............................. 11-375206
Dec. 28, 1999  (JP) .............................. 11-375207
Apr. 26, 2000  (JP) .............................. 2000-126156

(51) Int. Cl.
C03B 8/02    (2006.01)
C01B 33/113  (2006.01)

(52) U.S. Cl. ........................................ 65/17.2; 65/440

(58) Field of Classification Search ................ 65/17.2, 65/395, 440; 516/77, 80, 81; 423/335, 338, 423/339; 264/28
See application file for complete search history.

(56) References Cited

U.S. PATENT DOCUMENTS 3,177,161 A *  4/1965  Smith-Johannsen ...... 428/539.5
3,512,571 A *  5/1970  Phelps ........................ 264/621
3,885,005 A *  5/1975  Downing et al. .............. 264/28
4,202,939 A *  5/1980  Mueller et al. ................ 435/96
4,871,695 A * 10/1989  Seki et al. ..................... 501/54
5,017,354 A *  5/1991  Simms et al. ............... 423/338
5,236,483 A    8/1993  Miyashita et al.
5,811,171 A *  9/1998  Osborne et al. ............ 428/141

FOREIGN PATENT DOCUMENTS

| JP | 54-134097 A  | 10/1979 |
| JP | 59-54632 A   | 3/1984  |
| JP | 59-69434 A   | 4/1984  |
| JP | 60-65733 A   | 4/1985  |
| JP | 62-241837 A  | 10/1987 |
| JP | 63-21212 A   | 1/1988  |
| JP | 63-185837 A  | 8/1988  |
| JP | 2-289416 A   | 11/1990 |
| JP | 3-174315 A   | 7/1991  |
| JP | 04-349126 A  | 12/1992 |
| JP | 5-85718 A    | 4/1993  |
| JP | 7-242411 A   | 9/1995  |
| JP | 8-26741 A    | 1/1996  |
| JP | 8-133718 A   | 5/1996  |
| JP | 10-152318 A  | 6/1998  |
| JP | 11-011929 A  | 1/1999  |
| JP | 11-11931 A   | 1/1999  |

OTHER PUBLICATIONS

Machine Translation of JP 08-133718, retrieved on Mar. 8, 2005.*

* cited by examiner

*Primary Examiner*—Carlos Lopez
(74) *Attorney, Agent, or Firm*—Birch, Stewart, Kolasch & Birch, LLP

(57) ABSTRACT

A hydrous silica gel is dehydrated by freezing, thawing, and removing water separated by thawing, thereby yielding silica particles. In addition, the silica particles thus formed is washed and fired, thereby producing a synthetic quartz glass power.

A water glass is dealkalized, an oxidizing agent and an acid are added, the mixture thus formed is passed through a hydrogen type cation exchange resin, the aqueous silica solution thus formed is then gelled, and the gelled material is then washed and fired, thereby producing a synthetic quartz powder.

Silica is sequentially held for a predetermined time at each temperature range of 150 to 400° C., 500 to 700° C., and 1,100 to 1,300° C., thereby producing a quartz glass.

3 Claims, No Drawings

METHOD FOR PRODUCING SILICA PARTICLES

This application is the national phase under 35 U.S.C. § 371 of PCT International Application No. PCT/JP00/09357 which has an International filing date of Dec. 28, 2000, which designated the United States of America.

TECHNICAL FIELD

The present invention relates to methods for dehydrating a hydrous silica gel and to methods for producing a synthetic quartz glass powder using the dehydrating method, and more particularly, relates to a method for producing a high-purity synthetic quartz glass powder which is used as a raw material for forming heat treatment members for semiconductors, crucibles for pulling semiconductor single crystals, optical members, and the like.

In addition, the present invention relates to methods for producing a high-purity synthetic quartz powder, and more particularly, relates to a method for producing a high-purity synthetic quartz powder which is used as a raw material for, forming heat treatment members for semiconductors, crucibles for pulling semiconductor single crystals, optical members, quartz lamps, reactor-core members, tool members, members of washing baths, and the like.

Furthermore, the present invention relates to methods for producing a quartz glass, and more particularly, relates to a high-purity quartz glass containing a small amount of OH groups, which is used as a raw material for forming heat treatment members for semiconductors, crucibles for pulling semiconductor single crystals, optical members, and the like.

BACKGROUND ART

Quartz glasses are roughly categorized into two groups in accordance with the raw materials therefor, that is, a natural quartz glass which is produced by steps of pulverizing a natural raw material, purification, and melting, and a synthetic quartz glass which is produced from a liquid silicon compound.

Although a natural quartz glass is inexpensive, the impurity content thereof is generally high, and in addition, the quality thereof is not stable. Accordingly, when a natural quartz glass is used as a raw material for forming heat treatment members for semiconductors, crucibles for pulling semiconductor single crystals, optical members, and the like, a high-purity natural quartz glass that is severely selected has been used; however, the impurity content thereof has still been high.

Accordingly, although a natural quartz has been used as a raw material for quartz for long years, due to variation in impurity, depletion of natural resources, environmental pollution caused by development, and the like, a synthetic quartz has been used in recent years.

Heretofore, since a synthetic quartz powder has been formed by using tetramethoxysilane, tetraethoxysilane, silicon tetrachloride, and the like, the synthetic quartz powder is highly pure but is expensive. Accordingly, when a synthetic quartz glass is formed by using the synthetic quartz powder, the manufacturing cost is increased; hence, the synthetic quartz powder has not been suitably applied to industrial uses.

On the other hand, movement towards higher integration density of semiconductor products has been in progress, and in particular, a high-purity synthetic quartz glass containing impurities at a significantly low content has been in demand for use in forming crucible members for pulling semiconductor single crystals. Due to the demand described above, attempts have been made to produce a high-purity synthetic quartz glass powder at a low cost, and methods using an inexpensive water glass as a raw material have been disclosed in, for example, Japanese Unexamined Patent Application Publication Nos. 59-54632, 4-349126, and 11-11929.

However, according to the methods disclosed in the above publications, since a hydrous silica gel is first obtained from a water glass, and silica, which is used as a direct raw material for producing a quartz glass, is then obtained by heating the hydrous silica thus formed for dehydration in order to remove water contained therein, the methods described above are not suitably applied to industrial uses in view of energy cost. In addition, since a small amount of water-soluble impurities contained in an aqueous phase is condensed by heating for dehydration, a washing step or the like must be sufficiently performed, and in this point of view, the methods described above are also not suitably applied to industrial uses. Furthermore, minor heavy metals contained in a synthetic quartz powder produced by the above methods cannot sufficiently be removed, and in particular, titanium cannot sufficiently be removed.

As other methods for producing a synthetic quartz glass, a method comprising hydrolyzing an alkoxysilane for gelation, decarbonizing, and subsequently firing at 1,200° C. or more has been disclosed by S. Sakka in "Treatise on Materials Science and Technology", No. 22, and a method which comprises forming silica from an alkali silicate and then firing has been disclosed in Japanese Unexamined Patent Application Publication No. 11-11931.

However, the silica described above contains relatively a large number of OH groups (silanol groups), and the number of the silanol groups cannot significantly be reduced by firing. When a quartz glass obtained from the silica containing silanol groups as described above is used as a raw material to produce crucibles for pulling semiconductor single crystals or the like, there have been practical problems in that bubbles are generated or the viscosity is decreased when the quartz glass is melted.

Accordingly, as a method for removing silanol groups from silica particles, a technique using the diffusion of silanol groups by holding silica particles in a dehumidified atmosphere at 1,220° C. for 50 hours has been disclosed in Japanese Unexamined Patent Application Publication No. 8-26741. However, since being performed by heat treatment for a long period of time, this method is not suitably applied to industrial uses, and in addition, there has been a problem in that silica particles are devitrified (crystallized).

In addition, in Japanese Unexamined Patent Application Publication No. 2-289416, a method for removing silanol groups by holding a raw material at 600 to 1,000° C. has been described; however, firing for a long period of time must be performed to sufficiently decrease the content of the silanol groups.

Accordingly, an object of the present invention is to provide a method for dehydrating a hydrous silica gel, which method can be suitably applied to industrial uses in view of energy cost, and to provide a method for producing a high-purity synthetic quartz glass powder, which method can be suitably applied to industrial uses in view of energy cost.

In addition, another object of the present invention is to provide a method for producing a high-purity synthetic quartz powder, in which a high-synthetic quartz powder containing an extremely small amount of titanium can be obtained even when a water glass, which is inexpensive, is used as a raw material.

Furthermore, still another object of the present invention is to provide a method for producing a quartz glass, in which a high-purity quartz glass containing an extremely small amount of silanol groups can be efficiently obtained.

DISCLOSURE OF INVENTION

Through intensive research by the inventors of the present invention in order to solve the problems described above, it was found that the objects described above can be achieved by the following methods for dehydrating hydrous silica gel and for producing a synthetic quartz glass described below, and hence, the present invention was made.

That is, a method for dehydrating a hydrous silica gel according to the first invention comprises a first step of freezing a hydrous silica gel, a second step of thawing the frozen hydrous silica gel, and a third step of removing water which is separated by thawing so as to obtain silica particles.

In addition, a method for producing a synthetic quartz glass powder according to the second invention comprises a first step of freezing a hydrous silica gel, a second step of thawing the frozen hydrous silica gel, a third step of removing water which is separated by thawing so as to obtain silica particles, a fourth step of washing the silica particles, and a fifth step of firing the washed silica.

In the method for producing the synthetic quartz glass powder according to the second invention, the hydrous silica gel used in the first step described above can be preferably obtained by gelating a water glass or an aqueous silica solution which is obtained by separating alkaline components from a water glass. It is preferable that, in the step of obtaining the hydrous silica gel used in the first step described above, 5 wt % to 50 ppm of hydrogen peroxide with respect to $SiO_2$ be used, and/or that, in at least one of the first to the fourth steps, 5 wt % to 50 ppm of hydrogen peroxide with respect to $SiO_2$ be used. Alternatively, in a stage before the hydrous silica gel used in the first step described above is formed by gelation, it is also preferable that 5 wt % to 50 ppm of an oxidizing agent with respect to $SiO_2$ be used.

In addition, a method for producing a high-purity synthetic quartz powder according to the third invention comprises a first step of performing dealkalizing treatment of a water glass to obtain an aqueous silica solution, a second step of adding an oxidizing agent and an acid to the aqueous silica solution obtained in the first step and then passing the aqueous silica solution through a hydrogen type cation exchange resin, a third step of gelating the aqueous silica solution obtained in the second step to form silica particles, a fourth step of washing the gelled silica, and a fifth step of firing the washed silica.

In the method described above, when the inventors of the present invention measured a specific surface area of silica particle at the stage in which a siloxane network is formed by performing dehydrating polycondensation of silanol groups contained in silica by firing silica used as a raw material so as to decrease the number of the silanol groups, it was found that a specific surface area of approximately 800 $m^2/g$ at the beginning was decreased to approximately 250 $m^2/g$ at approximately 300° C. From this result, it is considered that extremely small pores present in silica at the beginning are crushed while being heated to above approximately 300° C., and that the efficiency of removing silanol groups is decreased.

Accordingly, the inventors of the present invention found that when pores are placed in a reduced-pressure atmosphere in a temperature range under a specific temperature at which the pores are not crushed, the most of the water and the silanol groups in the silica can be efficiently decreased, whereby the fourth and the fifth inventions were made.

That is, the fourth invention is a method for producing a quartz glass, which comprises heating silica, maintaining the silica in a temperature range of 150 to 400° C. for 3 hours or more as a first heating stage, and subsequently maintaining the silica in a temperature range of 1,100 to 1,300° C. for 1 hour or more as a second heating stage (however, in every heating stage, heating in a temperature range of 500° C. or less is at least performed in a reduced-pressure atmosphere).

In addition, the fifth invention is a method for producing a quartz glass, which comprises heating silica, maintained the silica in a temperature range of 150 to 400° C. for 30 minutes or more as a first heating stage, then maintaining the silica in a temperature range of 500 to 700° C. for 30 minutes or more as a second heating stage, and subsequently maintaining the silica in a temperature range of 1,100 to 1,300° C. for 1 hour or more as a third heating stage (however, until the second heating stage, heating is performed in a reduced-pressure atmosphere).

BEST MODE FOR CARRYING OUT THE INVENTION

First, embodiments of the first and the second inventions will be described.

As the hydrous silica gel used for a method for dehydrating a hydrous silica gel of the first invention, a gelled material of a water glass or an aqueous silica solution formed by separating alkaline components from a water glass is preferably used but is not specifically limited. For the steps of freezing, thawing, and dehydration described below, the hydrous gel preferably contains approximately 50% or more of water, and more preferably approximately 70 to 97%. In addition, the hydrous silica gel preferably has a shorter axis of 0.1 mm or more, and more preferably of 1 mm or more.

When the water content is less than 50%, the efficiencies of freezing, thawing, and dehydration described below are low, and when the short axis of the gel is less than 0.1 mm, the efficiencies of freezing, thawing, and dehydration described below also tend to be low.

The gelating method of the first invention is not limited at all, and other know methods may be used; however, as a method for obtaining a silica gel in a preferable state as described above, for example, when a water glass is first gelled, a hydrous silica gel may be obtained by adding an acid to the water glass (or adding the water glass to an acid) followed by heating (or by being held at room temperature).

In the case described above, since alkaline components, acidic components, alkali metal salts, and the like are present in the water glass in addition to the silica component, when necessary, the alkaline components, the acidic components, the alkali metal salts, and the like may be removed by washing. In addition, since alkaline components, acidic components, alkali metal salts, and the like may be incorporated in the hydrous silica gel, when necessary, they may be removed by washing at an optional stage.

Next, when the aqueous silica solution obtained by separating the alkaline components from the water glass is gelled, as a method for separating alkaline components from a water glass, for example, there may first be mentioned a method for separating alkaline components by adding sulfuric acid to the water glass so that the alkali sulfates are precipitated, or a method for removing the alkaline components from the water glass by a method using a cation exchange resin, electrophoresis, or electrolytic dialysis (the solution is preferably acidic so as to be stable and easy to handle). In addition, other known methods may also be mentioned.

A method for gelating the aqueous silica solution thus obtained is not specifically limited, and known methods may be used. For example, a method for dehydrating an aqueous silica solution, a method for heating an aqueous silica solution (for example, an aqueous silica which is stable under general use conditions in a pH rage of 0.1 to 2.0 can be gelled by heating), or a method for gelating an aqueous silica solution by adjusting the pH in the range of 2.0 to 8.0 (the pH is preferably in the range of 4.0 to 8.0, and when the pH is less than 4.0 and, in particular, not more than 3.0, although the solution is stable under general use conditions as described above, the solution in this pH range can also be gelled when being held for a long period of time) may be used; however, in order to perform gelation in a shorter period of time, the method for gelating an aqueous silica solution by adjusting the pH in the range of 4.0 to 8.0 is preferably used.

The first step of the first invention is to freeze the hydrous silica gel as described above. Freezing may be performed at a temperature or less at which the hydrous silica gel starts to freeze. Although the temperature at which a hydrous silica gel starts to freeze is changed with a change in the silica content thereof, freezing generally starts at approximately $-2$ to $-15°$ C., and hence, freezing may be performed at a freezing-start temperature or below of the hydrous silica gel described above.

A freezing rate in the first step of the first invention is not specifically limited, and the freezing rate is determined in accordance with the level of a freezing temperature compared with the freezing-start temperature, the type of refrigerant (specific heat), a contact area with the refrigerant, and the like. In general, the slower the freezing rate, the smaller the amount of water contained in silica particles after the thawing and the water separation, which are described below. In contrast, the faster the freezing rate, the smaller the energy cost for freezing. Accordingly, in accordance with applications of the present invention, freezing rate may be determined in consideration of energy cost for drying the water contained in silica particles in a subsequent step compared with that for freezing.

The second step of the first invention is to thaw the hydrous silica gel frozen in the first step described above. The method for thawing is not limited at all, and the thawing can be simply performed by holding the frozen hydrous silica gel at room temperature; however, in order to thaw the frozen hydrous silica gel in a short period of time, heating may also be performed by using hot water, hot wind, or the like.

When the frozen silica gel is thawed in the second step, frozen water is separated, and hence, the silica gel thus thawed will never return to the previous hydrous silica gel.

The third step of the first invention is to remove the water separated by thawing in the second step described above. By the separation of the water due to the thawing, since the hydrous silica gel is separated into the free water and silica particles, the free water can be easily separated by a conventionally known method such as filtration.

The silica particles thus obtained contain 20% to 80% of water; however, when necessary, drying can be performed by a known method at a temperature of, for example, 40 to 200° C., and when further necessary, by performing pulverization, more dried silica particles can be obtained.

By performing the first to the third steps of the first invention described above, dehydration can be performed at a significantly low energy cost compared to that for heating dehydration. In addition, in a hydrous silica gel, for example, water-soluble impurities at a small content, such as polyvalent metal ions, are contained due to a water glass used as a raw material for the hydrous silica gel; however, by performing the first to the third steps described above, since being transferred into the free water, the water-soluble impurities at the small content are removed, and the contents of the impurities in the silica separated from the free water are significantly low compared to those obtained by heating dehydration.

Next, a method for producing a synthetic quartz glass powder of the second invention will be described in detail.

This producing method comprises a first step of freezing a hydrous silica gel, a second step of thawing the hydrous silica gel thus frozen, a third step of removing free water separated by the thawing so as to obtain silica particles, a fourth step of washing the silica particles, and a fifth step of firing the washed silica, and the method for dehydrating the hydrous silica gel of the present invention described above may be applied, as it is, to the first to the third steps described above.

The fourth step of the second invention is to remove impurities adhered to the silica by washing the silica particles obtained in the third step. Prior to the washing, the silica particles are preferably pulverized into finer particles in order to improve the washing effect. The pulverizing method is not specifically limited, and methods generally used for pulverizing silica particles may be used. In addition, when necessary, the silica particles may be dried. This drying method is not specifically limited, and drying may be performed at a temperature of, for example, 40 to 200° C.

Washing may be performed by a general method such as washing using water; however, iron components may be incorporated in the silica particles during pulverization, washing using an acidic aqueous solution is preferably performed. In the step described above, after washing using an acidic aqueous solution, it is preferable that rinsing be performed using water or preferably using ultra pure water.

The acidic aqueous solution described above is not specifically limited, and for example, hydrochloric acid, sulfuric acid, nitric acid, or the like may be used alone or in combination. The concentration of an acid is also not specifically limited, and 2 to 20 wt % is preferable. When the concentration is 2 wt % or more, the effect is apparent; however, when the concentration is more than 20 wt %, the effect is not further improved, and on the contrary, for rinsing after the acid washing, extra washing time and an extra amount of washing water may be used in some cases.

The washing of the silica particles described above may be enough when performed in a manner equivalent to that of a general washing; however, washing is preferably performed at a temperature in the range of 40° C. to a boiling point for approximately 10 minutes to 4 hours.

The fifth step of the second invention is to obtain a high-purity quartz powder containing an extremely small amount of OH groups by firing the silica obtained in the fourth step described above. In this firing, a firing method of the fourth invention or the fifth invention, which will be described later in detail, may be used.

The temperature and the time for firing may be approximately equivalent to those for firing performed for obtaining a conventional high-purity quartz. Since a high-purity quartz preferably contains the amount of OH groups as small as possible, and a quartz having a smaller amount of OH groups can be obtained by firing at a higher temperature for a longer time, the conditions may optionally be determined so as to obtain a desired amount of OH groups.

In addition, since the silica particles obtained in the fourth step contains 20% to 80% of water, it is efficient and preferable from industrial point of view that firing be performed for silica particles which are dehydrated beforehand.

In the method for producing the synthetic quartz glass powder of the second invention, it is preferable that 5 wt % to 50 ppm of hydrogen peroxide be used with respect to $SiO_2$ in a step of preparing the hydrous silica gel used in the first step, or that, with or without using the hydrogen peroxide described above, 5 wt % to 50 ppm of hydrogen peroxide be used with respect to $SiO_2$ in at least one of the first to the fourth steps.

Hydrogen peroxide is preferably used since the removable rate of metal impurities, particularly polyvalent metal impurities, is improved. However, when the usage thereof is less than 50 ppm, the effect is not significant, and on the other hand, when the usage is more than 5 wt %, the effect is not further improved and a problem of waste water treatment or the like may arise in some cases.

Hereinafter, the method for using hydrogen peroxide will be described in detail. As the method for using hydrogen peroxide in second invention, there may be mentioned, for example, (1) a method for adding hydrogen peroxide to a water glass before being gelled, (2) a method for adding hydrogen peroxide to an acid used for gelating a water glass, (3) a method for supplying hydrogen peroxide beforehand in a container in which a water glass is reacted with an acid, (4) a method for adding hydrogen peroxide to a water glass before being gelled when alkaline components are removed therefrom, (5) a method for adding hydrogen peroxide to sulfuric acid which is used as a neutralizing agent added to remove alkaline components from a water glass, (6) a method for supplying hydrogen peroxide beforehand in a container in which a neutralization reaction occurs between a water glass and an acid, (7) a method for adding hydrogen peroxide to a system in which a neutralization reaction previously occurred between a water glass and sulfuric acid, (8) a method for adding hydrogen peroxide to a system in which an alkaline sulfate obtained by a neutralization reaction between a water glass and sulfuric acid is not filtrated, (9) a method for adding hydrogen peroxide to a system in which an alkaline sulfate is being filtrated, (10) a method for adding hydrogen peroxide to a filtrate obtained by filtrating an alkaline sulfate, (11) a method for adding hydrogen peroxide to a system in which a water glass is not gelled and an alkaline component is removed therefrom, (12) a method for adding hydrogen peroxide to a system in which a water glass is being gelled, (13) a method for, after gelation, bringing hydrogen peroxide into contact (immersion, shower, or the like) with the gel, (14) a method for, after gelation, bringing hydrogen peroxide into contact (immersion, shower, or the like) with the gel before being frozen, (15) a method for adding hydrogen peroxide to a system in which a gel has been thawed, (16) a method for washing silica particles by adding hydrogen peroxide to washing water, and (17) a method for washing silica by adding hydrogen peroxide to an acidic aqueous solution for washing. By using those methods described above, the effect of decreasing the amount of polyvalent metal impurities can be obtained. Of those methods described above, the above (1), (2), (3), (4), (5), (6), (7), (8), (10), (11), (15), (16), and (17) are preferable since the effect of decreasing the amount of polyvalent metal impurities and the workability are superior, and among those mentioned above, the above (1), (2), (3), (4), (5), (6), (7), (8), (10), (11), (15), and (17) are more preferable.

In the method for producing the synthetic quartz glass powder, in a stage before the hydrous silica gel used in the first step is formed by gelation, at least 5 wt % to 50 ppm of an oxidizing agent is used with respect to $SiO_2$, and preferably, 2 wt % to 100 ppm of an oxidizing agent is used with respect to $SiO_2$.

That is, an oxidizing agent is preferably used since the removal rate of metal impurities, particularly polyvalent metal impurities, is improved. However, when the usage thereof is less than 50 ppm, the effect is not significant, and on the other hand, when the usage is more than 5 wt %, the effect is not further improved and a problem of waste water treatment or the like may arise in some cases.

The oxidizing agent which can be used in the second invention is not specifically limited. For example, there may be mentioned sodium peroxide, sodium percarbonate, peracetic acid, sodium perborate, potassium permanganate, sodium permanganate, potassium periodate, sodium periodate, ammonium persulfate, potassium persulfate, sodium persulfate, or sodium nitrite, and these materials may be used alone or in combination. The oxidizing agent described above which is used alone or in combination may also used together with hydrogen peroxide; however, the total amount of those oxidizing agent described above and hydrogen peroxide is preferably in the range described above.

Hereinafter, the usage of oxidizing agents, the combination thereof, and a mixture of the oxidizing agent and hydrogen peroxide (hereinafter simply referred to as "oxidizing agent or the like") will be described in detail. As the method for using the oxidizing agent or the like, there may be mentioned, for example, (1) a method for adding an oxidizing agent or the like to a water glass before gelation, (2) a method for adding an oxidizing agent or the like to an acid used for gelating a water glass, (3) a method for supplying an oxidizing agent or the like beforehand in a container in which a water glass is reacted with an acid, (4) a method for adding an oxidizing agent or the like to a water glass before gelation when alkaline components are removed from the water glass, (5) a method for adding an oxidizing agent or the like to sulfuric acid which is used as a neutralizing agent added to remove alkaline components from a water glass, (6) a method for supplying an oxidizing agent or the like beforehand in a container in which a neutralization reaction occurs between a water glass and an acid, (7) a method for adding an oxidizing agent or the like to a system in which a neutralization reaction previously occurred between a water glass and sulfuric acid, (8) a method for adding an oxidizing agent or the like to a system in which an alkaline sulfate obtained by a neutralization reaction between a water glass and sulfuric acid is not filtrated, (9) a method for adding an oxidizing agent or the like to a system in which an alkaline sulfate is being filtrated, (10) a method for adding an oxidizing agent or the like to a filtrate obtained by filtrating an alkaline sulfate, or (11) a method for adding an oxidizing agent or the like to a system in which a water glass is not gelled and an alkaline component is removed therefrom.

Next, an embodiment of the third invention will be described.

A water glass used in a first step of the third invention is not specifically limited, and any type of water glass may be used; however, a water glass having a molar ratio $SiO_2/M_2O$ (M is Na, K, or Li, and Na is preferable in view of industrial purpose since easily available) preferably in the range of 0.4 to 10.0, or more preferably in the range of 0.5 to 8.0, is used. When the molar ratio is less than 0.4, a large facility is necessary to produce an aqueous silica solution by performing dealkalizing treatment. On the other hand, when the molar ratio is more than 10.0, it is difficult to produce industrially a stable water glass, and hence, it is difficult to obtain a water glass. Consequently, both water glasses having the molar ratios described above tend to have insufficient properties applied to industrial uses.

In addition, a $SiO_2$ concentration in a water glass is preferably 2 to 30 wt %, and more preferably 3 to 15 wt %. When the concentration is less than 2 wt %, gelation is difficult to perform in a third step described later, and in addition, a large amount of energy is necessary when dehydration is performed, whereby this water glass is not suitably applied to industrial uses. On the other hand, when the concentration is more than 30 wt %, the aqueous silica solution obtained in the first step tends to be unstable.

In order to obtain a water glass having the concentration in the range described above, of the various methods that can be used, the simplest method is to use a water glass having the concentration described above as it is. In this method, the concentration is simply controlled when a water glass is produced. Another method is to dilute a water glass having a concentration higher than that described above with water (preferably pure water). In addition, a water-soluble alkali silicate powder, which is commercially available, is dissolved in water (preferably pure water) so as to obtain a water glass having the concentration described above.

The first step of the third invention is to obtain an aqueous silica solution by performing dealkalizing treatment of a water glass, and the dealkalizing treatment used in this step is not specifically limited, and for example, a method using a cation ion exchange resin, electrophoresis, electrolytic dialysis, or the like may be used. In this step, most of the alkaline is removed by the dealkalizing treatment preferably down to a $Na_2O$ concentration of 1% or less and more preferably down to a pH of 5.0 or less.

As the dealkalizing treatment described above, a method using a hydrogen type cation exchange resin is preferably used. The hydrogen type cation exchange resin in this embodiment is not specifically limited, and a commercially available strong acid type cation exchange resin in the form of beads, fibers, clothes, or the like may be used.

A method for passing the water glass described above through these hydrogen type cation exchange resins is not specifically limited, and for example, a method for passing a water glass through a column filled with the hydrogen type cation exchange resin, or a known method in which a water glass is treated with a hydrogen type cation exchange resin by a batch operation may be used. In this connection, a used hydrogen type cation exchange resin may be recovered to a hydrogen type by a general method, that is, by using an acid such as hydrochloric acid, sulfuric acid, or nitric acid.

A second step of the third invention is to add an oxidizing agent and an acid to the aqueous silica solution obtained in the previous step and is to pass this aqueous silica solution through a hydrogen type cation exchange resin.

The oxidizing agent used in the second step of the third invention is not specifically limited. For example, there may be mentioned hydrogen peroxide, sodium peroxide, sodium percarbonate, peracetic acid, sodium perborate, potassium permanganate, sodium permanganate, potassium periodate, sodium periodate, ammonium persulfate, potassium persulfate, sodium persulfate, or sodium nitrite, and these materials may be used alone or in combination. Of the oxidizing agents mentioned above, when hydrogen peroxide is used, since the remaining product is only water, post treatment is not necessary at all, and hence, hydrogen peroxide is preferably used in view of workability and efficiency.

The addition of the oxidizing agent described above promotes the ionization of minor heavy metals contained in an aqueous silica solution and serves to improve the removal rate of the heavy metals in the following third step. Accordingly, the lower limit of a preferable usage of the oxidizing agent mentioned above depends on the amount of the minor heavy metals mentioned above; however, it is not advantageous from industrial point of view that the measurement of the amount of minor heavy metals is frequently performed. Since the minor heavy metals are derived from a water glass used as a raw material, the usage of an oxidizing agent can be determined on the basis of the amount of $SiO_2$. That is, a preferable usage of the oxidizing agent is 0.5 ppm or more with respect to the weight of $SiO_2$ in an aqueous silica solution and is more preferably 1.0 ppm or more. The upper limit of the usage of the oxidizing agent is not specifically limited; however, since the effect cannot be further improved even when 3,000 ppm or more of the oxidizing agent is used with respect to the weight of $SiO_2$, the usage of the oxidizing agent is preferably set to 3,000 ppm or less with respect to the weight of $SiO_2$ in view of industrial efficiency.

The acid used in the second step of the third invention is not specifically limited, and for example, hydrochloric acid, sulfuric acid, or nitric acid may be used. These may be used alone or in combination. The aqueous silica solution obtained in the first step once becomes acidic; however, since the pH thereof increases with time, and gelation will occur in the neutral region unless otherwise treated, the aqueous silica solution is stabilized in the second step by adding an acid. Accordingly, the usage of the acid to be used is controlled so that the pH of the aqueous silica solution is in the range of 0.1 to 3.0, or more preferably in the range of 0.2 to 2.0.

The second step of the third invention is to pass the aqueous silica solution that contains the oxidizing agent and the acid as described above through a hydrogen type cation exchange resin. The hydrogen type cation exchange resin used in this embodiment is not specifically limited, and a commercially available strong acid type cation exchange resin in the form of beads, fibers, clothes, or the like may be used.

A method for passing the aqueous silica solution described above through these hydrogen type cation exchange resins is not specifically limited, and for example, a method for passing an aqueous silica solution through a column filled with the hydrogen type cation exchange resin, or a known method in which an aqueous silica solution is treated with a hydrogen type cation exchange resin by a batch operation may be used. In this connection, a used hydrogen type cation exchange resin may be recovered to a hydrogen type by a general method, that is, by using an acid such as hydrochloric acid, sulfuric acid, or nitric acid.

By the treatment in which the aqueous silica solution is passed through the hydrogen type cation exchange resin, most of minor heavy metal, particularly titanium, can be removed. In the treatment described above, for example, one liter of an aqueous silica solution is preferably passed through 20 to 200 g of a hydrogen type cation exchange resin.

The third step of the third invention is to obtain silica particles by gelating the aqueous silica solution obtained in the second step. A method for gelating is not specifically limited, and general methods may be used. That is, a method for dehydrating an aqueous silica solution, a method for heating an aqueous silica solution (for example, an aqueous silica which is stable under general use conditions in a pH rage of 0.1 to 2.0 can be gelled by heating), a method for gelating an aqueous silica solution by adjusting the pH in the range of 2.0 to 8.0 or preferably in the range of 4.0 to 8.0 (when the pH is less than 4.0 and, in particular, not more than 3.0, although the solution is stable under general use conditions, as described above, the solution in this pH range can also be gelled when being held for a long period of time), or the like may be used. However, in order to perform gelation in a shorter period of time, the method for gelating an aqueous silica solution by adjusting the pH in the range of 4.0 to 8.0 is preferably used.

Since the aqueous silica solution used in the third step of the third invention is acidic, an alkaline agent is used for adjusting the pH, and in order to obtain a high-purity product, ammonia or aqueous ammonia is preferably used.

When the gelled silica is processed by a general method for, for example, drying at a temperature of 40 to 200° C. and, when necessary, pulverizing, silica particles are obtained. Alternatively, silica particles may be obtained by the dehydration method of the first invention.

A fourth step of the third invention is to remove impurities adhered to silica by washing the silica obtained in the third step. Prior to the washing, in order to improve the washing effect, the silica particles are preferably pulverized to form finer particles. The pulverizing method is not specifically limited, and a method generally used for pulverizing silica particles may be used. In this step, when necessary for pulverizing, the silica particles may be dried. The drying method is not specifically limited, and drying may be performed at a temperature of, for example, 40 to 200° C.

Washing may be performed by a washing method that is generally performed; however, since iron components may be incorporated in the silica particles during pulverization, washing is preferably performed using an acidic aqueous solution. In the step described above, after the washing with an acidic aqueous solution, rinsing is preferably performed with water (preferably ultra pure water).

The acidic aqueous solution is not specifically limited, and for example, hydrochloric acid, sulfuric acid, or nitric acid may be used, and they may be used alone or in combination. The concentration of the acid is also not specifically limited; however, 2 to 20 wt % of an acid is preferable. When the concentration is 2 wt % or more, the effect is significant, and even when the concentration is more than 20 wt %, the effect is not further improved, and on the contrary, for rinsing after the acid washing, extra washing time and an extra amount of washing water may be used in some cases.

In addition, hydrogen peroxide is preferably added to an acidic aqueous solution for washing since remaining metal components at a small content can also be removed. Although hydrogen peroxide at a concentration of 2% or more is added, the effect is not further improved, and on the contrary, a problem of waste water treatment may arise. In the step described above, the effect can be obtained by adding an extremely small amount of hydrogen peroxide; however, a concentration of 100 ppm or more is preferable since the effect is significant.

The washing of silica described above may be enough when performed in a manner equivalent to that of washing which is generally performed; however, the washing is preferably performed at a temperature range of 40° C. to a boiling point for approximately 10 minutes to 4 hours.

A fifth step of the third invention is to obtain a high-purity quartz powder containing an extremely small amount of OH groups by firing the silica obtained in the fourth step. This firing may be performed by a firing method of the fourth invention or the fifth invention that will be described later in detail.

The temperature and the time for firing may be approximately equivalent to those for firing performed previously for obtaining a high-purity quartz. Since a high-purity quartz preferably contains OH groups as small as possible, and a quartz having a smaller amount of OH groups can be obtained by firing at a higher temperature for a longer time, the conditions may optionally be set so as to obtain a desired amount of OH groups.

When the silica obtained in the fourth step contains water, it is preferable and efficient in industrial point of view that firing be performed after the silica is dehydrated by a general method.

Next, embodiments of the fourth and the fifth inventions will be described.

Silica used in the fourth invention is not specifically limited, and any type of silica that can be applied to industrial uses and has a purity preferably used for a targeted application of a quartz glass may be used. For example, silica obtained by gelating an alkaline silicate, or silica obtained by gelating an alkoxide, such as methyl silicate or ethyl silicate, by hydrolysis may be used. As the silica obtained by gelation of an alkaline silicate, the silica obtained by the fourth step of the second invention or the third invention may be preferably used. The raw silica material as described above is preferably powdered silica.

In the fourth invention, silanol groups are removed by heating the raw silica material, and in every heating stage in a temperature range of at least 500° C. or less, heating is performed under a reduced-pressure atmosphere. The degree of reduced pressure is not specifically limited; however, it is set to approximately 65 kPa or less and preferably 45 kPa or less. When the reduced-pressure atmosphere in the temperature range of 500° C. or less is not maintained as described above, the removal rate of silanol groups is decreased. Hereinafter, unless otherwise stated, the condition in the fourth invention is a reduced-pressure atmosphere in the temperature range described above. In this connection, every step may be performed under a reduced pressure; however, when the reduced pressure is released (returned to a normal pressure), dried air or a dried inert gas (nitrogen, argon, or the like) is preferably fed.

In the heating of the raw silica material according to the fourth invention, the raw silica material is first held as a first heating stage in a temperature range of 150 to 400° C. for 3 hours or more, or preferably for 6 hours or more.

In this first heating stage, most of the silanol groups are removed. When the holding time is less than that mentioned above, the silica is exposed to an atmosphere at a higher temperature before the silanol groups are sufficiently removed, and remaining silanol groups are formed.

The upper limit of the holding time of the first heating stage is not specifically limited, and the longer holding time can reliably remove the silanol groups; however, in view of appropriate industrial efficiency, the holding time is preferably 20 hours or less, and more preferably 15 hours or less.

In addition, when the holding temperature is less than that mentioned above, the silanol groups cannot be sufficiently removed, and when the holding temperature is more than that mentioned above, pores are crushed before the silanol groups are sufficiently removed; hence, a sufficient removal of the silanol groups cannot be performed.

In the fourth invention, after the first heating stage, as a second heating stage, the silica is heated to a temperature range of 1,100 to 1,300° C. and is held for 1 hour or more. In the second heating stage, silanol groups that are difficult to remove can even be sufficiently removed.

When the holding temperature is less than that mentioned above, a sufficient removal of the silanol groups cannot be performed. On the contrary, when the holding temperature is more than that mentioned above, sintering between silica particles occurs, and as a result, the applications of the quartz glass is extremely limited (in order to expand the applications, a powdered quartz glass is preferably used; however, when the sintered material is again formed into a powder, new surfaces absorb water, and hence, silanol groups are increased).

When the holding time of the second heating stage is less than that mentioned above, the silanol groups are not sufficiently removed. The upper limit of the holding time is not specifically limited, and the longer holding time can reliably remove the silanol groups; however, in view of appropriate industrial efficiency, the holding time is preferably 20 hours or less, and more preferably 15 hours or less.

Next, the fifth invention will be described in detail.

Silica used in the fifth invention is not specifically limited, and silica equivalent to the silica used in the fourth invention may be used.

In the fifth invention, silanol groups are removed by heating the raw silica material, and until a second heating stage described below, the heating is performed in a reduced-pressure atmosphere. The degree of reduced pressure is not specifically limited; however, it may be set to approximately 65 kPa or less and preferably 45 kPa or less. When the reduced-pressure atmosphere is not maintained until the second heating stage as described above, the removal rate of silanol groups is decreased. Hereinafter, unless otherwise stated, the condition until the second heating condition in the fifth invention is a reduced-pressure atmosphere. In this connection, every step may be performed in a reduced pressure; however, when a reduced pressure is released (returned to a normal pressure), dried air or a dried inert gas (nitrogen, argon, or the like) is preferably fed.

In addition, in the fifth invention, the removal of the silanol groups by heating the silica can be more efficiently performed by heating in a shorter period of time.

In the heating of the raw silica material in the fifth invention, the raw silica material is first held as a first heating stage in a temperature range of 150 to 400° C. for 30 minutes or more, or preferably for 1 hour or more.

In this first heating stage, most of the silanol groups that are easily removed are removed. When the holding time is less than that mentioned above, the silica is exposed to an atmosphere at a high temperature before the silanol groups are sufficiently removed, and hence, remaining silanol groups are formed.

The upper limit of the holding time of the first heating stage is not specifically limited, and the longer holding time can reliably remove the silanol groups; however, in view of appropriate industrial efficiency and in order to efficiently remove the silanol groups in a short period of time, the holding time is preferably 10 hours or less, and more preferably 7 hours or less.

In addition, when the holding temperature is less than that mentioned above, the silanol groups cannot be sufficiently removed. On the contrary, when the holding temperature is more than that mentioned above, pores are crushed before the silanol groups are sufficiently removed, and as a result, a sufficient removal of the silanol groups cannot also be performed.

In the fifth invention, after the first heating stage, as a second heating stage, the silica is heated to a temperature range of 500 to 700° C. and is held for 30 minutes or more, or preferably 1 hour or more. Silanol groups that are relatively difficult to remove can even be sufficiently removed in the second heating stage.

When the holding temperature is less than that mentioned above, the silica is exposed to an atmosphere at a high temperature while the silanol groups that are relatively difficult to remove are not sufficiently removed, and as a result, remaining silanol groups are formed.

The upper limit of the holding time of the second heating stage is not specifically limited, and the longer holding time can reliably remove the silanol groups that are relatively difficult to remove; however, in view of appropriate industrial efficiency and in order to efficiently remove the silanol groups in a short period of time, the holding time is preferably 10 hours or less, and more preferably 7 hours or less.

When the holding time of the second heating stage is less than that mentioned above, the silanol groups that are relatively difficult to remove are not sufficiently removed. On the contrary, when the holding temperature is more than that mentioned above, pores are crushed before the silanol groups that are difficult to remove are sufficiently removed, and hence, the removal of the silanol groups that are relatively difficult to remove cannot also be sufficiently performed.

In the fifth invention, after the second heating stage, as a third heating stage, the silica is heated to a temperature range of 1,100 to 1,300° C. and is held for 1 hour or more. Silanol groups that are difficult to remove can even be sufficiently removed in the third heating stage.

When the holding temperature is less than that mentioned above, a sufficient removal of the silanol groups that are difficult to remove cannot be performed. On the contrary, when the holding temperature is more than that mentioned above, sintering between silica particles occurs, and as a result, the applications of the quartz glass is extremely limited (in order to expand the applications, a powdered quartz glass is preferably used; however, when the sintered material is again formed into a powder, new surfaces absorb water, and hence, silanol groups are increased.

When the holding time of the third heating stage is less than that mentioned above, the silanol groups that are difficult to remove are not sufficiently removed. The upper limit of the holding time is not specifically limited, and the longer holding time can reliably remove the silanol groups; however, in view of appropriate industrial efficiency, the holding time is preferably 20 hours or less, and more preferably 15 hours or less.

Hereinafter, the present invention will be described with reference to examples; however, the present invention is not limited thereto.

A first and a second example will first be described.

(Synthesis of Hydrous Silica Gel 1)

A 40-wt % aqueous sulfuric acid solution in an amount of 185 g was placed in a 10-liter beaker, was controlled at a temperature of 5° C. by using an ice bath, and was stirred by a propeller made from polytetrafluoroethylene. A water glass ($SiO_2/Na_2O=1.0$, a SiO2 concentration of 12 wt %) formed by dissolving 150.9 g of sodium silicate pentahydrate in 198 g of pure water was dripped into the beaker for 25 minutes.

Subsequently, 740 g of a 40-wt % aqueous sulfuric acid solution and a water glass ($SiO_2/Na_2O$=1.0, a SiO2 concentration of 12 wt %) formed by dissolving 603.6 g of sodium silicate pentahydrate in 792 g of pure water were simultaneously dripped into the beaker for 2 hours. The neutralization temperature was controlled in the range of 5 to 10° C. A sodium sulfate crystal was precipitated by the neutralization reaction; however, since the pH of the solution was 0.7, gelation of silica did not occur.

By cooling this solution to 3° C. using an ice bath, the sodium sulfate is recrystallized, and the sodium sulfate (940 g) was removed by filtration using a filter (5 μm) made from polytetrafluoroethylene, thereby yielding an aqueous silica solution at a pH of 0.7.

This aqueous silica solution was held at room temperature for a long period of time (3 hours) for gelation, thereby yielding a hydrous silica gel (1).

(Synthesis of Hydrous Silica Gel 2)

A 40-wt % aqueous sulfuric acid solution in an amount of 108 g was placed in a 10-liter beaker, was controlled at a temperature of 5° C. by using an ice bath, and was stirred by a propeller made from polytetrafluoroethylene. A water glass ($SiO_2/Na_2O$=3.3, a SiO2 concentration of 12 wt %) formed by dissolving 150 g of grade 3 sodium silicate in 198 g of pure water was dripped into the beaker for 25 minutes. Subsequently, 740 g of a 40-wt % aqueous sulfuric acid solution and a water glass ($SiO_2/Na_2O$=3.3, a SiO2 concentration of 12 wt %) formed by dissolving 600 g of grade 3 sodium silicate in 800 g of pure water were simultaneously dripped into the beaker for 2 hours. The neutralization temperature was controlled in the range of 5 to 10° C. A sodium sulfate crystal was precipitated by the neutralization reaction; however, since the pH of the solution was 0.5, gelation of silica did not occur.

By cooling this solution to 3° C. using an ice bath, the sodium sulfate is recrystallized, and the sodium sulfate (130 g) was removed by filtration using a filter (5 μm) made from polytetrafluoroethylene, thereby yielding an aqueous silica solution at a pH of 0.5.

This aqueous silica solution thus obtained was held at room temperature for a long period of time (3 hours) for gelation, thereby yielding a hydrous silica gel (2).

(Synthesis of Hydrous Silica Gel 3)

A 40-wt % aqueous sulfuric acid solution in an amount of 93 g was placed in a 10-liter beaker, was controlled at a temperature of 5° C. by using an ice bath, and was stirred by a propeller made from polytetrafluoroethylene. A water glass ($SiO_2/Na_2O$=1.0, a SiO2 concentration of 7.6 wt %) formed by dissolving 75 g of sodium silicate pentahydrate in 200 g of pure water was dripped into the beaker for 15 minutes. Subsequently, 370 g of a 40-wt % aqueous sulfuric acid solution and a water glass ($SiO_2/Na_2O$=1.0, a SiO2 concentration of 7.7 wt %) formed by dissolving 302 g of sodium silicate pentahydrate in 790 g of pure water were simultaneously dripped into the beaker for 2 hours. The neutralization temperature was controlled in the range of 5 to 10° C. A sodium sulfate crystal was precipitated by the neutralization reaction; however, since the pH of the solution was 0.8, gelation of silica did not occur.

By cooling this solution to 3° C. using an ice bath, the sodium sulfate is recrystallized, and the sodium sulfate (390 g) was removed by filtration using a filter (5 μm) made from polytetrafluoroethylene, thereby yielding an aqueous silica solution at a pH of 0.8.

This aqueous silica solution was held at room temperature for a long period of time (3 hours) for gelation, thereby yielding a hydrous silica gel (3).

(Synthesis of Hydrous Silica Gel 4)

Pure water in an amount of 100 g was placed in a 10-liter beaker, was controlled at a temperature of 5° C. by using an ice bath, and was stirred by a propeller made from polytetrafluoroethylene. A 40-wt % aqueous sulfuric acid solution in an amount of 323 g and a water glass ($SiO_2/Na_2O$=3.3, a SiO2 concentration of 14 wt %) formed by dissolving 750 g of a grade 3 water glass in 800 g of pure water were simultaneously dripped into the beaker for 2 hours. The neutralization temperature was controlled in the range of 5 to 10° C. A sodium sulfate crystal was precipitated by the neutralization reaction; however, since the pH of the solution was 0.5, gelation of silica did not occur.

By cooling this solution to 3° C. using an ice bath, the sodium sulfate is recrystallized, and the sodium sulfate (120 g) was removed by filtration using a filter (5 μm) made from polytetrafluoroethylene, thereby yielding an aqueous silica solution at a pH of 0.5.

This aqueous silica solution was held at room temperature for a long period of time (3 hours) for gelation, thereby yielding a hydrous silica gel (4).

(Synthesis of Hydrous Silica Gel 5)

A hydrous silica gel (5) was obtained in a manner equivalent to that of the synthesis of the hydrous silica gel (1) except that 0.1 wt % of hydrogen peroxide with respect to the $SiO_2$ component was added to the 40-wt % aqueous sulfuric acid solution.

(Synthesis of Hydrous Silica Gel 6)

A hydrous silica gel (6) was obtained in a manner equivalent to that of the synthesis of the hydrous silica gel (2) except that 80 ppm of hydrogen peroxide with respect to the $SiO_2$ component was added to the water glass solution.

(Synthesis of Hydrous Silica Gel 7)

A hydrous silica gel (7) was obtained in a manner equivalent to that of the synthesis of the hydrous silica gel (3) except that 1.2 wt % of hydrogen peroxide with respect to the $SiO_2$ component was added to the system in which the neutralization reaction previously occurred.

(Synthesis of Hydrous Silica Gel 8)

A hydrous silica gel was obtained in a manner equivalent to that of the synthesis of the hydrous silica gel (1) except that 0.1 wt % of sodium percarbonate with respect to the $SiO_2$ component was added to the 40-wt % aqueous sulfuric acid solution.

(Synthesis of Hydrous Silica Gel 9)

A hydrous silica gel was obtained in a manner equivalent to that of the synthesis of the hydrous silica gel (2) except that 80 ppm of peracetic acid with respect to the $SiO_2$ component was added to the water glass solution.

(Synthesis of Hydrous Silica Gel 10)

A raw water glass material (a $SiO_2$ concentration of 29 wt %) having a molar ratio $SiO_2/Na_2O$ of 3.2 was diluted with pure water to form a water glass having a $SiO_2$ concentration of 6 wt %. With respect to the weight of $SiO_2$ of this water glass, 2,000 ppm of hydrogen peroxide was added to this water glass, and 1,000 g of this water glass was then passed through a column filled with a hydrogen type cation exchange resin (Amberlite IR-120B manufactured by Organo Corp.) for dealkalizing treatment, thereby yielding 1,150 g of an aqueous silica solution having a $SiO_2$ concentration of 5.0 wt % and a pH of 2.5.

Hydrochloric acid was added to the aqueous silica solution thus obtained so that the pH thereof was 1.0, and subsequently, this aqueous silica solution was passed through a column filled with 100 ml of a hydrogen type cation exchange resin (Amberlite IR-120B manufactured by Organo Corp.) so as to remove minor metal ions, thereby yielding a high-purity aqueous silica solution.

Ammonia water was added to the aqueous silica solution thus obtained so that the pH thereof was 6.0, and the aqueous silica solution was then held at room temperature so that the entirety thereof was gelled, thereby yielding a hydrous silica gel (10).

(Synthesis of Hydrous Silica Gel 11)

A raw water glass material (a SiO2 concentration of 29 wt %) having a molar ratio $SiO_2/Na_2O$ of 3.2 was diluted with pure water to form a water glass having a $SiO_2$ concentration of 6 wt %. This water glass in an amount of 1,000 g was passed through a column filled with a hydrogen type cation exchange resin (Amberlite IR-120B manufactured by Organo Corp.) for dealkalizing treatment, thereby yielding 1,150 g of an aqueous silica solution having a $SiO_2$ concentration of 5.0 wt % and a pH of 2.5.

Hydrochloric acid was added to the aqueous silica solution thus obtained so that the pH thereof is 1.0, and 2,000 ppm of hydrogen peroxide was then added to this aqueous silica solution with respect to the weight of $SiO_2$ contained therein. Subsequently, this aqueous silica solution was passed through a column filled with 100 ml of a hydrogen type cation exchange resin (Amberlite IR-120B manufactured by Organo Corp.) so as to remove minor metal ions, thereby yielding a high-purity aqueous silica solution.

Ammonia water was added to the aqueous silica solution thus obtained so that the pH thereof was 6.0, and the aqueous silica solution was then held at room temperature so that the entirety thereof was gelled, thereby yielding a hydrous silica gel (11).

(Synthesis of Hydrous Silica Gel 12)

A raw water glass material (a SiO2 concentration of 29 wt %) having a molar ratio $SiO_2/Na_2O$ of 3.2 was diluted with pure water to form a water glass having a $SiO_2$ concentration of 8 wt %. To 1,000 g of this water glass, 100 g of an aqueous hydrochloric acid at a concentration of 3.5% and 2,000 ppm of hydrogen peroxide with respect to the weight of $SiO_2$ contained in this water glass were added, and this water glass thus formed was then passed through a column filled with a hydrogen type cation exchange resin (Amberlite IR-120B manufactured by Organo Corp.) for dealkalizing treatment, thereby yielding 1,250 g of an aqueous silica solution having a $SiO_2$ concentration of 6.4 wt % and a pH of 1.0.

Ammonia water was added to the aqueous silica solution thus obtained so that the pH thereof was 4.5, and the aqueous silica solution was then held at room temperature so that the entirety thereof was gelled, thereby yielding a hydrous silica gel (12).

(Synthesis of Hydrous Silica Gel 13)

A raw water glass material (a SiO2 concentration of 29 wt %) having a molar ratio $SiO_2/Na_2O$ of 3.2 was diluted with pure water, thereby yielding 500 g of a water glass having a $SiO_2$ concentration of 15 wt %. The pH of this water glass was controlled to be 1.0 by adding hydrochloric acid, and 2,000 ppm of hydrogen peroxide with respect to the weight of $SiO_2$ contained in this water glass was then added thereto. Subsequently, this water glass thus formed was then passed through a column filled with 2,000 ml of a hydrogen type cation exchange resin (Amberlite IR-120B manufactured by Organo Corp.) for dealkalizing treatment and for removing minor metal ions, thereby yielding a high-pure aqueous silica solution.

Ammonia water was added to the aqueous silica solution thus obtained so that the pH thereof was 6.0, and the aqueous silica solution was then held at room temperature so that the entirety thereof was gelled, thereby yielding a hydrous silica gel (13).

EXAMPLE 1

The hydrous silica gel (1) was frozen at −5° C. for 10 hours. Subsequently, the hydrous silica gel thus frozen was thawed at room temperature. By removing the water separated by thawing, silica particles were obtained.

The removal of this water could be performed at approximately one-fifth of the amount of energy and at approximately one-half of the energy cost compared to the case in which heating dehydration was performed. In addition, the amount of polyvalent metal components contained in the silica particles after the water was separated was less than one-tenth of that in the case in which heating dehydration was performed.

Next, after the silica particles thus obtained were pulverized by using a quartz mortar together with a pestle and were then sieved by a 50 to 200 mesh gauze made from polypropylene, the silica particles thus processed were placed in a 3-liter beaker made of a quartz glass, were then boiled with 1 liter of ultra pure water for 2 hours, and were separated by filtration using a filter made from polytetrafluoroethylene. The operation described above was repeated 5 times. Next, an aqueous hydrochloric acid solution at a concentration of 10 wt % was added to the silica particles thus obtained, and the silica particles was boiled for 1 hour and was then filtrated. Subsequently, boiling washing was performed 6 times in a manner equivalent to that described above, thereby yielding high-purity silica.

After the high-purity silica thus obtained was dried at 150° C., firing was performed at 1,200° C. for 20 hours, thereby yielding a high-purity quartz glass powder (180 g).

EXAMPLE 2

The hydrous silica gel (2) was frozen at −10° C. for 3 hours. Subsequently, the frozen hydrous silica was thawed at room temperature. By removing the water separated by thawing, silica particles were obtained.

Next, a high-purity quartz glass powder was obtained in a manner equivalent to that in Example 1. At a very low energy cost, a significantly high-pure quartz glass powder could be obtained.

EXAMPLE 3

The hydrous silica gel (3) was frozen at −20° C. for 1 hours. Subsequently, the frozen hydrous silica was thawed at room temperature. By removing the water separated by thawing, silica particles were obtained.

Next, a high-purity quartz glass powder was obtained in a manner equivalent to that in Example 1. At a very low energy cost, a significantly high-pure quartz glass powder could be obtained.

EXAMPLE 4

Flash-freezing was performed by immersing the hydrous silica gel (4) in liquid nitrogen. Subsequently, the frozen hydrous silica was thawed at room temperature. By removing the water separated by thawing, silica particles were obtained.

Next, a high-purity quartz glass powder was obtained in a manner equivalent to that in Example 1. At a very low energy cost, a significantly high-pure quartz glass powder could be obtained.

EXAMPLES 5 TO 13

High-purity quartz glass powders were obtained in a manner equivalent to that in Example 2 except that the hydrous silica gels (5) to (13) were used. In each case of using the hydrous silica gels mentioned above, at a very low energy cost, a significantly high-pure quartz glass powder could be obtained.

EXAMPLE 14

A high-purity quartz glass powder was obtained in a manner equivalent to that in Example 4 except that 200 ppm of hydrogen peroxide with respect to the $SiO_2$ component of the silica particles was added to a hydrochloric acid solution at a concentration of 10 wt % used for washing. At a very low energy cost, a significantly high-pure quartz glass powder could be obtained.

EXAMPLE 15

A high-purity quartz glass powder was obtained in a manner equivalent to that in Example 7 except that 200 ppm of hydrogen peroxide with respect to the $SiO_2$ component of the silica particles was added to a hydrochloric acid solution at a concentration of 10 wt % used for washing. At a very low energy cost, a significantly high-pure quartz glass powder could be obtained.

EXAMPLE 16

A high-purity quartz glass powder was obtained in a manner equivalent to that in Example 13 except that 200 ppm of hydrogen peroxide with respect to the $SiO_2$ component of the silica particles was added to a hydrochloric acid solution at a concentration of 10 wt % used for washing. At a very low energy cost, a significantly high-pure quartz glass powder could be obtained.

The conditions of Examples 1 to 16 are collectively shown in Tables 1 and 2.

TABLE 1

| SYNTHESIS OF HYDROUS SILICA GEL NO. | | EXAMPLE 1 (1) | EXAMPLE 2 (2) | EXAMPLE 3 (3) | EXAMPLE 4 (4) | EXAMPLE 5 (5) | EXAMPLE 6 (6) | EXAMPLE 7 (7) |
|---|---|---|---|---|---|---|---|---|
| RAW MATERIAL | $SiO_2/Na_2O$ MOLAR RATIO | 1.0 | 3.3 | 1.0 | 3.3 | 1.0 | 3.3 | 1.0 |
| | $SiO_2$ CONCENTRATION (wt %) | 12 | 12 | 7.6 | 14 | 12 | 12 | 7.6 |
| METHOD FOR PRODUCING AQUEOUS SILICA SOLUTION | | ADDITION OF SULFURIC ACID | ADDITION OF SULFURIC ACID | ADDITION OF SULFURIC ACID | ADDITION OF SULFURIC ACID | ADDITION OF SULFURIC ACID | ADDITION OF SULFURIC ACID | ADDITION OF SULFURIC ACID |
| pH OF AQUEOUS SILICA SOLUTION | | 0.7 | 0.5 | 0.8 | 0.5 | 0.7 | 0.5 | 0.8 |
| GELATION METHOD | | LEAVE FOR 3 HOURS | LEAVE FOR 3 HOURS | LEAVE FOR 3 HOURS | LEAVE FOR 3 HOURS | LEAVE FOR 3 HOURS | LEAVE FOR 3 HOURS | LEAVE FOR 3 HOURS |
| ADDITION OF OXIDIZING AGENT OR HYDROGEN PEROXIDE | TIME OF ADDITION | — | — | — | — | ADDITION TO SULFURIC ACID | ADDITION TO WATER GLASS | ADDITION TO SYSTEM AFTER NEUTRALIZATION REACTION |
| | OXIDIZING AGENT OR HYDROGEN PEROXIDE | — | — | — | — | $H_2O_2$ | $H_2O_2$ | $H_2O_2$ |
| | ADDED AMOUNT (WITH RESPECT TO $SiO_2$) | — | — | — | — | 0.1 wt % | 80 ppm | 1.2 wt % |
| FREEZING METHOD | FREEZING TEMPERATURE | −5° C. | −10° C. | −20° C. | IMMERSION IN LIQUID NITROGEN | −10° C. | −10° C. | −10° C. |
| | FREEZING TIME | 10 HOURS | 3 HOURS | 1 HOUR | | 3 HOURS | 3 HOURS | 3 HOURS |

TABLE 2

| SYNTHESIS OF HYDROUS SILICA GEL NO. | | EXAMPLE 8 (8) | EXAMPLE 9 (9) | EXAMPLE 10 (10) | EXAMPLE 11 (11) | EXAMPLE 12 (12) |
|---|---|---|---|---|---|---|
| RAW MATERIAL | $SiO_2/Na_2O$ MOLAR RATIO | 1.0 | 3.3 | 3.2 | 3.2 | 3.2 |
| | $SiO_2$ CONCENTRATION (wt %) | 12 | 12 | 6 | 6 | 8 |

TABLE 2-continued

| METHOD FOR PRODUCING AQUEOUS SILICA SOLUTION | | ADDITION OF SULFURIC ACID | ADDITION OF SULFURIC ACID | ION EXCHANGE RESIN | ION EXCHANGE RESIN | ION EXCHANGE RESIN |
|---|---|---|---|---|---|---|
| pH OF AQUEOUS SILICA SOLUTION | | 0.7 | 0.5 | 6.0 AFTER ADDITION OF AQUEOUS AMMONIA | 6.0 AFTER ADDITION OF AQUEOUS AMMONIA | 4.5 AFTER ADDITION OF AQUEOUS AMMONIA |
| GELATION METHOD | | LEAVE FOR 3 HOURS | LEAVE FOR 3 HOURS | LEAVE AT ROOM TEMPERATURE | LEAVE AT ROOM TEMPERATURE | LEAVE AT ROOM TEMPERATURE |
| ADDITION OF OXIDIZING AGENT OR HYDROGEN PEROXIDE | TIME OF ADDITION | ADDITION TO SULFURIC ACID | ADDITION TO WATER GLASS | ADDITION TO WATER GLASS | ADDITION TO SILICA SOLUTION BEFORE GELATION | ADDITION TO WATER GLASS |
| | OXIDIZING AGENT OR HYDROGEN PEROXIDE | SODIUM PERCARBONATE | PERACETIC ACID | $H_2O_2$ | $H_2O_2$ | $H_2O_2$ |
| | ADDED AMOUNT (WITH RESPECT TO $SiO_2$) | 0.1 wt % | 80 ppm | 2000 ppm | 2000 ppm | 2000 ppm |
| FREEZING METHOD | FREEZING TEMPERATURE | −10° C. | −10° C. | −10 | −10° C. | −10 |
| | FREEZING TIME | 3 HOURS | 3 HOURS | 3 HOURS | 3 HOURS | 3 HOURS |

| | | EXAMPLE 13 | EXAMPLE 14 | EXAMPLE 15 | EXAMPLE 16 |
|---|---|---|---|---|---|
| SYNTHESIS OF HYDROUS SILICA GEL NO. | | (13) | (4) | (7) | (13) |
| RAW MATERIAL | $SiO_2/Na_2O$ MOLAR RATIO | 3.2 | 3.3 | 1.0 | 3.2 |
| | $SiO_2$ CONCENTRATION (wt %) | 15 | 14 | 7.6 | 15 |
| METHOD FOR PRODUCING AQUEOUS SILICA SOLUTION | | ION EXCHANGE RESIN | ADDITION OF SULFURIC ACID | ADDITION OF SULFURIC ACID | ION EXCHANGE RESIN |
| pH OF AQUEOUS SILICA SOLUTION | | 6.0 AFTER ADDITION OF AQUEOUS AMMONIA | 0.5 | 0.8 | 6.0 AFTER ADDITION OF AQUEOUS AMMONIA |
| GELATION METHOD | | LEAVE AT ROOM TEMPERATURE | LEAVE FOR 3 HOURS | LEAVE FOR 3 HOURS | LEAVE AT ROOM TEMPERATURE |
| ADDITION OF OXIDIZING AGENT OR HYDROGEN PEROXIDE | TIME OF ADDITION | ADDITION TO SILICA SOLUTION BEFORE GELATION | ADDITION TO HYDROCHLORIC ACID USED FOR WASHING SILICA | ADDITION TO HYDROCHLORIC ACID USED FOR WASHING SILICA | ADDITION TO HYDROCHLORIC ACID USED FOR WASHING SILICA |
| | OXIDIZING AGENT OR HYDROGEN PEROXIDE | $H_2O_2$ | $H_2O_2$ | $H_2O_2$ | $H_2O_2$ |
| | ADDED AMOUNT (WITH RESPECT TO $SiO_2$) | 2000 ppm | 200 ppm | 200 ppm | 200 ppm |
| FREEZING METHOD | FREEZING TEMPERATURE | −10° C. | IMMERSION IN LIQUID NITROGEN | −10° C. | −10° C. |
| | FREEZING TIME | 3 HOURS | | 3 HOURS | 3 HOURS |

EXAMPLE 1A

As the first step, a raw water glass material (a $SiO_2$ concentration of 29 wt %) having a molar ratio $SiO_2/Na_2O$ of 3.2 was diluted with pure water to form a water glass having a $SiO_2$ concentration of 6 wt %. This water glass in an amount of 1,000 g was then passed through a column filled with a hydrogen type cation exchange resin (Amberlite IR-120B manufactured by Organo Corp.) for dealkalizing treatment, thereby yielding 1,150 g of an aqueous silica solution having a $SiO_2$ concentration of 5.0 wt % and a pH of 2.5.

As the second step, hydrochloric acid was added to the aqueous silica solution obtained in the first step so that the pH thereof is 1.0, and 2,000 ppm of hydrogen peroxide used as an oxidizing agent with respect to the weight of $SiO_2$ in the aqueous silica solution was added thereto. Subsequently, this aqueous silica solution was passed through a column filled with 100 ml of a hydrogen type cation exchange resin (Amberlite IR-120B manufactured by Organo Corp.) so as to remove minor metal ions, thereby yielding a high-purity aqueous silica solution.

As the third step, ammonia water was added to the aqueous silica solution obtained in the second step so that the pH thereof was 6.0, and the aqueous silica solution was then held at room temperature so that the entirety thereof was gelled, thereby yielding 920 g of a silica gel material. This silica gel material was dried at 90° C. for 10 hours, thereby yielding 575 g of silica particles.

As the fourth step, the silica particles obtained in the third step were pulverized in a quartz mortar to form silica particles having a particle diameter of approximately 0.1 to 1 mm and were then immersed for washing in one liter of hydrochloric acid solution at a concentration of 10 wt % containing 1 wt % of hydrogen peroxide at 90° C. for 60 minutes. Subsequently, rinsing was performed using ultra pure water, thereby obtaining 575 g of high-purity silica.

As the fifth step, after the high-purity silica obtained in the fourth step was dried at 150° C., firing was performed at 1,200° C. for 20 hours, thereby yielding a high-purity quartz powder.

Analysis values of the high-pure quartz powder thus obtained are shown in Table 3 below.

EXAMPLE 2A

A high-pure quartz powder was obtained in a manner equivalent to that in Example 1A except that the dilution rate of the raw water glass material in the first step was changed, and that the $SiO_2$ concentration of the water glass to be processed by dealkalizing treatment was 3.5 wt %. Analysis values of the high-pure quartz powder thus obtained are shown in Table 3 below.

EXAMPLE 3A

A high-pure quartz powder was obtained in a manner equivalent to that in Example 1A except that the dilution rate of the raw water glass material in the first step was changed, and that the $SiO_2$ concentration of the water glass to be processed by dealkalizing treatment was 7.5 wt %. Analysis values of the high-pure quartz powder thus obtained are shown in Table 3 below.

EXAMPLE 4A

A high-pure quartz powder was obtained in a manner equivalent to that in Example 1A except that the amount of the ion exchange resin used for dealkalizing treatment in the first step was changed, and that the pH of the obtained aqueous silica solution was 4.0. Analysis values of the high-pure quartz powder thus obtained are shown in Table 3 below.

EXAMPLE 5A

A high-pure quartz powder was obtained in a manner equivalent to that in Example 1A except that the dealkalizing treatment in the first step was changed to a batch operation. Analysis values of the high-pure quartz powder thus obtained are shown in Table 3 below.

EXAMPLE 6A

A high-pure quartz powder was obtained in a manner equivalent to that in Example 1A except that the dealkalizing treatment was performed by dialysis using 4 pieces each of anionic and cation exchange films which are alternately disposed in an electrolytic dialysis bath by passing a DC current of 3 $A/dm^2$ through the water glass so that the pH was 8.0. Analysis values of the high-pure quartz powder thus obtained are shown in Table 3 below.

EXAMPLE 7A

A high-pure quartz powder was obtained in a manner equivalent to that in Example 1A except that 100 ppm of hydrogen peroxide was used as an oxidizing agent in the second step with respect to the weight of $SiO_2$. Analysis values of the high-pure quartz powder thus obtained are shown in Table 3 below.

EXAMPLE 8A

A high-pure quartz powder was obtained in a manner equivalent to that in Example 1A except that 10 ppm of hydrogen peroxide was used as an oxidizing agent in the second step with respect to the weight of $SiO_2$. Analysis values of the high-pure quartz powder thus obtained are shown in Table 3 below.

EXAMPLE 9A

A high-pure quartz powder was obtained in a manner equivalent to that in Example 1A except that 2,000 ppm of peracetic acid was used as an oxidizing agent in the second step with respect to the weight of $SiO_2$. Analysis values of the high-pure quartz powder thus obtained are shown in Table 3 below.

EXAMPLE 10A

A high-pure quartz powder was obtained in a manner equivalent to that in Example 1A except that nitric acid was used for pH adjustment in the second step in place of hydrochloric acid. Analysis values of the high-pure quartz powder thus obtained are shown in Table 3 below.

EXAMPLE 11A

A high-pure quartz powder was obtained in a manner equivalent to that in Example 1A except that sulfuric acid was used for pH adjustment in the second step in place of hydrochloric acid. Analysis values of the high-pure quartz powder thus obtained are shown in Table 3 below.

EXAMPLE 12A

A high-pure quartz powder was obtained in a manner equivalent to that in Example 1A except that the treatment using a hydrogen type cation exchange resin in the second step was performed by a batch operation. Analysis values of the high-pure quartz powder thus obtained are shown in Table 3 below.

COMPARATIVE EXAMPLE 1A

A high-pure quartz powder was obtained in a manner equivalent to that in Example 1A except that hydrogen peroxide was not used in the second step. Analysis values of the quartz powder thus obtained are shown in Table 3 below.

COMPARATIVE EXAMPLE 2A

A high-pure quartz powder was obtained in a manner equivalent to that in Example 1A except that hydrochloric acid was not used in the second step. Analysis values of the quartz powder thus obtained are shown in Table 3 below.

COMPARATIVE EXAMPLE 3A

A high-pure quartz powder was obtained in a manner equivalent to that in Example 1A except that the second step was not performed. Analysis values of the quartz powder thus obtained are shown in Table 3 below.

COMPARATIVE EXAMPLE 4A

Analysis values of natural quartz (which contains an extremely small amount of impurities and is a so-called semiconductor grade) are shown in Table 3 below.

thereof was set to 7.0 by adding 25% ammonia water, so that the entire mixture was gelled. This gel was sufficiently washed with distilled water and was dried in a drier at 150° C. for 24 hours, thereby yielding 70 g of a silica gel. This silica gel was named a high-purity silica glass powder (1). The analysis values are shown in Table 4 below.

Preparation of High-Purity Silica Glass Powder 2

Water in an amount of 50 g and 10 g of hydrochloric acid solution at a concentration of 35% were added to 342 g of commercially available ethyl silicate (a $SiO_2$ content of 35 wt % manufactured by Nippon Colcoat Co., Ltd.) and were mixed together at room temperature for 10 hours. Subsequently, 740 g of water was added so that a uniform mixture was prepared, and the pH thereof was set to 7.5 by adding 25% ammonia water, so that the entire mixture was gelled. This gel was immersed in a hydrochloric acid solution at a concentration of 10% for 3 hours, was then sufficiently washed with distilled water, and was dried in a drier at 150° C. for 24 hours, thereby yielding 140 g of a silica gel. This silica gel was named a high-purity silica glass powder (2). The analysis values are shown in Table 4 below.

TABLE 3

| | OH GROUP | Al | Fe | Ti | Na | K | Li | Ca | Mg | Cr | Mn | Co | Ni | Cu |
|---|---|---|---|---|---|---|---|---|---|---|---|---|---|---|
| EXAMPLE 1A | 41 | 0.2 | 0.1 | 0.2 | <0.1 | <0.1 | <0.1 | 0.2 | <0.05 | <0.05 | <0.05 | <0.05 | <0.05 | <0.05 |
| EXAMPLE 2A | 53 | 0.1 | 0.1 | 0.1 | <0.1 | <0.1 | <0.1 | 0.2 | <0.05 | <0.05 | <0.05 | <0.05 | <0.05 | <0.05 |
| EXAMPLE 3A | 38 | 0.2 | 0.2 | 0.2 | 0.1 | <0.1 | <0.1 | 0.2 | <0.05 | <0.05 | <0.05 | <0.05 | <0.05 | <0.05 |
| EXAMPLE 4A | 40 | 0.2 | 0.1 | 0.2 | 0.1 | <0.1 | <0.1 | 0.2 | <0.05 | <0.05 | <0.05 | <0.05 | <0.05 | <0.05 |
| EXAMPLE 5A | 45 | 0.1 | 0.1 | 0.1 | <0.1 | <0.1 | <0.1 | 0.1 | <0.05 | <0.05 | <0.05 | <0.05 | <0.05 | <0.05 |
| EXAMPLE 6A | 44 | 0.1 | 0.1 | 0.1 | <0.1 | <0.1 | <0.1 | 0.1 | <0.05 | <0.05 | <0.05 | <0.05 | <0.05 | <0.05 |
| EXAMPLE 7A | 42 | 0.2 | 0.1 | 0.2 | <0.1 | <0.1 | <0.1 | 0.2 | <0.05 | 0.05 | <0.05 | <0.05 | <0.05 | 0.05 |
| EXAMPLE 8A | 39 | 0.3 | 0.2 | 0.3 | <0.1 | <0.1 | <0.1 | 0.2 | 0.05 | 0.05 | <0.05 | <0.05 | <0.05 | 0.05 |
| EXAMPLE 9A | 47 | 0.2 | 0.1 | 0.2 | <0.1 | <0.1 | <0.1 | 0.2 | <0.05 | <0.05 | <0.05 | <0.05 | <0.05 | <0.05 |
| EXAMPLE 10A | 40 | 0.2 | 0.1 | 0.1 | <0.1 | <0.1 | <0.1 | 0.2 | <0.05 | <0.05 | <0.05 | <0.05 | <0.05 | <0.05 |
| EXAMPLE 11A | 39 | 0.1 | 0.1 | 0.2 | <0.1 | <0.1 | <0.1 | 0.2 | <0.05 | <0.05 | <0.05 | <0.05 | <0.05 | <0.05 |
| EXAMPLE 12A | 46 | 0.2 | 0.1 | 0.1 | <0.1 | <0.1 | <0.1 | 0.1 | <0.05 | <0.05 | <0.05 | <0.05 | <0.05 | <0.05 |
| COMPARATIVE EXAMPLE 1A | 40 | 63 | 74 | 128 | 10 | 1 | 1 | 10 | 5 | 0.1 | 0.1 | 0.1 | 0.1 | 0.1 |
| COMPARATIVE EXAMPLE 2A | 42 | 81 | 79 | 137 | 12 | 2 | 2 | 22 | 6 | 0.1 | 0.1 | 0.1 | 0.1 | 0.1 |
| COMPARATIVE EXAMPLE 3A | 45 | 102 | 81 | 153 | 15 | 4 | 5 | 35 | 8 | 0.2 | 0.2 | 0.1 | 0.1 | 0.1 |
| COMPARATIVE EXAMPLE 4A | 21 | 8 | 0.2 | 1.2 | 0.2 | 0.2 | 0.25 | 0.6 | <0.05 | <0.05 | <0.05 | <0.05 | <0.05 | <0.05 |

All values in the table indicate weight in ppm.

Next, examples of the fourth and the fifth inventions will be described.

Preparation of High-Purity Silica Glass Powder 1

Water in an amount of 50 g and 10 g of hydrochloric acid solution at a concentration of 35% were added to 208 g of tetraethyl orthosilicate and were mixed together at room temperature for 10 hours. Subsequently, 340 g of water was added so that a uniform mixture was prepared, and the pH Preparation of High-Purity Silica Glass Powder 3

A commercially available grade 3 water glass (29 wt % of $SiO_2$ and 9 wt % of $Na_2O$, manufactured by Asahi Denka Kogyo K.K.) in an amount of 100 g was diluted by 5 times its volume by water and was then processed by a hydrogen type cation exchange resin, thereby yielding an aqueous silica solution having 5 wt % of $SiO_2$ and a pH of 2.5. After this aqueous silica solution was controlled so as to have a pH of 1.0 by adding nitric acid and was again processed by a hydrogen type cation exchange resin, drying was performed in a drier at 150° C. for 24 hours, thereby yielding 28 g of a silica gel. This silica gel was processed by acid washing and water washing alternately and repeatedly, and was again dried at 150° C. for 4 hours, thereby yielding a high-purity silica glass powder (3). The analysis values are shown in Table 4 below.

Preparation of High-Purity Silica Glass Powder 4

A commercially available grade 4 water glass (26 wt % of $SiO_2$ and 6.5 wt % of $Na_2O$, manufactured by Asahi Denka Kogyo K.K.). in an amount of 100 g was diluted by 2 times its volume by water and was then added to 100 g of water containing 12 g of sulfuric acid while sufficiently stirred, thereby yielding an acidic silica sol. This silica sol was held to form a gel and was then dried at 150° C. This dried material was again washed 5 times with an aqueous sulfuric acid solution at a concentration of 10% and was further washed 10 times with distilled water, thereby yielding 25 g of a silica gel. This silica gel was again dried at 150° C. for 4 hours, thereby yielding a high-purity silica glass powder (4). The analysis values are shown in Table 4 below.

TABLE 4

| ANALYSIS VALUE | Al | Fe | Na | K | Ca | Ti | Cr | Ni | Cu |
|---|---|---|---|---|---|---|---|---|---|
| HIGH-PURITY SILICA GLASS POWDER (1) | 30 | 43 | 8 | 6 | 14 | 32 | <8 | <8 | <8 |
| HIGH-PURITY SILICA GLASS POWDER (2) | 35 | 30 | 10 | 7 | 18 | 45 | <8 | <8 | <8 |
| HIGH-PURITY SILICA GLASS POWDER (3) | 450 | 52 | 12 | 8 | 34 | 450 | <8 | <8 | <8 |
| HIGH-PURITY SILICA GLASS POWDER (4) | 205 | 43 | 20 | 7 | 55 | 105 | <8 | <8 | <8 |

(UNIT: ppb)

EXAMPLE 1B

A quartz crucible containing the high-purity silica gel powder (1) in an amount of 10 g, which was pulverized to form 50 to 200 mesh powder, was placed in a heating furnace, was then heated from room temperature to 300° C. for 3 hours in a reduced-pressure atmosphere of 13.3 kPa, and subsequently was maintained at 300° C. for 5 hours as the first heating stage.

Next, the temperature was increased from 300 to 600° C. at a rate of 100° C./hour and was then maintained at 600° C. for 4 hours as the second heating stage.

Subsequently, a reduced pressure was released by feeding a dry nitrogen gas, and the temperature was increased to 1,200° C. at a rate of 60° C./hour and was then maintained at 1,200° C. for 10 hours as the third heating stage, thereby yielding a quartz glass powder.

The content of silanol groups in the quartz glass powder thus obtained was measured by an infrared absorption spectroscope, and the measurement result was 34 ppm.

The content of silanol groups in a sample formed by melting this quartz glass powder at a normal pressure was 38 ppm, the viscosity thereof at 1,400° C. was $3.3 \times 10^{10}$ poise, and both properties were superior.

EXAMPLE 2B

A quartz glass powder was obtained in a manner equivalent to that in Example 1B except that the high-purity silica glass powder (2) was used as a raw silica glass powder.

The content of silanol groups in the quartz glass powder thus obtained was measured by an infrared absorption spectroscope, and the measurement result was 31 ppm.

The content of silanol groups in a sample formed by melting this quartz glass powder at a normal pressure was 34 ppm, the viscosity thereof at 1,400° C. was $3.3 \times 10^{10}$ poise, and both properties were superior.

EXAMPLE 3B

A quartz glass powder was obtained in a manner equivalent to that in Example 1B except that the high-purity silica glass powder (3) was used as a raw silica glass powder.

The content of silanol groups in the quartz glass powder thus obtained was measured by an infrared absorption spectroscope, and the measurement result was 35 ppm.

The content of silanol groups in a sample formed by melting this quartz glass powder at a normal pressure was 35 ppm, the viscosity thereof at 1,400° C. was $3.4 \times 10^{10}$ poise, and both properties were superior.

EXAMPLE 4B

A quartz glass powder was obtained in a manner equivalent to that in Example 1B except that the high-purity silica glass powder (4) was used as a raw silica glass powder.

The content of silanol groups in the quartz glass powder thus obtained was measured by an infrared absorption spectroscope, and the measurement result was 35 ppm.

The content of silanol groups in a sample formed by melting this quartz glass powder at a normal pressure was 36 ppm, the viscosity thereof at 1,400° C. was $3.4 \times 10^{10}$ poise, and both properties were superior.

EXAMPLE 5B

A quartz glass powder was obtained in a manner equivalent to that in Example 1B except that the holding temperature in the first heating stage was 180° C.

The content of silanol groups in the quartz glass powder thus obtained was measured by an infrared absorption spectroscope, and the measurement result was 32 ppm.

The content of silanol groups in a sample formed by melting this quartz glass powder at a normal pressure was 34 ppm, the viscosity thereof at 1,400° C. was $3.3 \times 10^{10}$ poise, and both properties were superior.

EXAMPLE 6B

A quartz glass powder was obtained in a manner equivalent to that in Example 1B except that the holding temperature in the first heating stage was 360° C.

The content of silanol groups in the quartz glass powder thus obtained was measured by an infrared absorption spectroscope, and the measurement result was 35 ppm.

The content of silanol groups in a sample formed by melting this quartz glass powder at a normal pressure was 37 ppm, the viscosity thereof at 1,400° C. was $3.3 \times 10^{10}$ poise, and both properties were superior.

EXAMPLE 7B

A quartz glass powder was obtained in a manner equivalent to that in Example 1B except that the holding temperature in the second heating stage was 530° C.

The content of silanol groups in the quartz glass powder thus obtained was measured by an infrared absorption spectroscope, and the measurement result was 36 ppm.

The content of silanol groups in a sample formed by melting this quartz glass powder at a normal pressure was 36

EXAMPLE 8B

A quartz glass powder was obtained in a manner equivalent to that in Example 1B except that the holding temperature in the second heating stage was 670° C.

The content of silanol groups in the quartz glass powder thus obtained was measured by an infrared absorption spectroscope, and the measurement result was 33 ppm.

The content of silanol groups in a sample formed by melting this quartz glass powder at a normal pressure was 38 ppm, the viscosity thereof at 1,400° C. was $3.3 \times 10^{10}$ poise, and both properties were superior.

EXAMPLE 9B

A quartz glass powder was obtained in a manner equivalent to that in Example 1B except that the holding temperature in the third heating stage was 1,120° C.

The content of silanol groups in the quartz glass powder thus obtained was measured by an infrared absorption spectroscope, and the measurement result was 38 ppm.

The content of silanol groups in a sample formed by melting this quartz glass powder at a normal pressure was 38 ppm, the viscosity thereof at 1,400° C. was $3.3 \times 10^{10}$ poise, and both properties were superior.

EXAMPLE 10B

A quartz glass powder was obtained in a manner equivalent to that in Example 1B except that the holding temperature in the third heating stage was 1,270° C.

The content of silanol groups in the quartz glass powder thus obtained was measured by an infrared absorption spectroscope, and the measurement result was 30 ppm.

The content of silanol groups in a sample formed by melting this quartz glass powder at a normal pressure was 31 ppm, the viscosity thereof at 1,400° C. was $3.3 \times 10^{10}$ poise, and both properties were superior.

EXAMPLE 11B

A quartz glass powder was obtained in a manner equivalent to that in Example 1B except that the holding time in the first heating stage was 1.5 hours.

The content of silanol groups in the quartz glass powder thus obtained was measured by an infrared absorption spectroscope, and the measurement result was 37 ppm.

The content of silanol groups in a sample formed by melting this quartz glass powder at a normal pressure was 37 ppm, the viscosity thereof at 1,400° C. was $3.3 \times 10^{10}$ poise, and both properties were superior.

EXAMPLE 12B

A quartz glass powder was obtained in a manner equivalent to that in Example 1B except that the holding time in the second heating stage was 1.5 hours.

The content of silanol groups in the quartz glass powder thus obtained was measured by an infrared absorption spectroscope, and the measurement result was 38 ppm.

The content of silanol groups in a sample formed by melting this quartz glass powder at a normal pressure was 39 ppm, the viscosity thereof at 1,400° C. was $3.3 \times 10^{10}$ poise, and both properties were superior.

EXAMPLE 13B

A quartz glass powder was obtained in a manner equivalent to that in Example 1B except that the holding time in the third heating stage was 2 hours.

The content of silanol groups in the quartz glass powder thus obtained was measured by an infrared absorption spectroscope, and the measurement result was 32 ppm.

The content of silanol groups in a sample formed by melting this quartz glass powder at a normal pressure was 38 ppm, the viscosity thereof at 1,400° C. was $3.3 \times 10^{10}$ poise, and both properties were superior.

EXAMPLE 14B

A quartz glass powder was obtained in a manner equivalent to that in Example 1B except that the degree of reduced pressure was 33.3 kPa.

The content of silanol groups in the quartz glass powder thus obtained was measured by an infrared absorption spectroscope, and the measurement result was 34 ppm.

The content of silanol groups in a sample formed by melting this quartz glass powder at a normal pressure was 35 ppm, the viscosity thereof at 1,400° C. was $3.3 \times 10^{10}$ poise, and both properties were superior.

EXAMPLE 15B

A quartz crucible containing the high-purity silica gel powder (1) in an amount of 10 g, which was pulverized to form 50 to 200 mesh powder, was placed in a heating furnace, was then heated from room temperature to 300° C. for 3 hours in a reduced-pressure atmosphere of 13.3 kPa, and subsequently was maintained at 300° C. for 10 hours as the first heating stage.

Next, the temperature was increased from 300 to 1,200° C. at a rate of 60° C./hour (when the temperature reached 600° C., the reduced pressure was released by feeding a dry nitrogen gas) and was then maintained at 1,200° C. for 10 hours as the second heating stage, thereby obtaining a quartz glass powder.

The content of silanol groups in the quartz glass powder thus obtained was measured by an infrared absorption spectroscope, and the measurement result was 32 ppm.

The content of silanol groups in a sample formed by melting this quartz glass powder at a normal pressure was 33 ppm, the viscosity thereof at 1,400° C. was $3.3 \times 10^{10}$ poise, and both properties were superior.

EXAMPLE 16B

A quartz glass powder was obtained in a manner equivalent to that in Example 15B except that the high-purity silica glass powder (2) was used as a raw silica glass powder.

The content of silanol groups in the quartz glass powder thus obtained was measured by an infrared absorption spectroscope, and the measurement result was 31 ppm.

The content of silanol groups in a sample formed by melting this quartz glass powder at a normal pressure was 35 ppm, the viscosity thereof at 1,400° C. was $3.3 \times 10^{10}$ poise, and both properties were superior.

EXAMPLE 17B

A quartz glass powder was obtained in a manner equivalent to that in Example 15B except that the high-purity silica glass powder (3) was used as a raw silica glass powder.

The content of silanol groups in the quartz glass powder thus obtained was measured by an infrared absorption spectroscope, and the measurement result was 34 ppm.

The content of silanol groups in a sample formed by melting this quartz glass powder at a normal pressure was 35 ppm, the viscosity thereof at 1,400° C. was $3.4 \times 10^{10}$ poise, and both properties were superior.

EXAMPLE 18B

A quartz glass powder was obtained in a manner equivalent to that in Example 15B except that the high-purity silica glass powder (4) was used as a raw silica glass powder.

The content of silanol groups in the quartz glass powder thus obtained was measured by an infrared absorption spectroscope, and the measurement result was 32 ppm.

The content of silanol groups in a sample formed by melting this quartz glass powder at a normal pressure was 34 ppm, the viscosity thereof at 1,400° C. was $3.4 \times 10^{10}$ poise, and both properties were superior.

EXAMPLE 19B

A quartz glass powder was obtained in a manner equivalent to that in Example 15B except that the holding temperature in the first heating stage was 180° C.

The content of silanol groups in the quartz glass powder thus obtained was measured by an infrared absorption spectroscope, and the measurement result was 36 ppm.

The content of silanol groups in a sample formed by melting this quartz glass powder at a normal pressure was 35 ppm, the viscosity thereof at 1,400° C. was $3.3 \times 10^{10}$ poise, and both properties were superior.

EXAMPLE 20B

A quartz glass powder was obtained in a manner equivalent to that in Example 15B except that the holding temperature in the first heating stage was 360° C.

The content of silanol groups in the quartz glass powder thus obtained was measured by an infrared absorption spectroscope, and the measurement result was 34 ppm.

The content of silanol groups in a sample formed by melting this quartz glass powder at a normal pressure was 38 ppm, the viscosity thereof at 1,400° C. was $3.3 \times 10^{10}$ poise, and both properties were superior.

EXAMPLE 21B

A quartz glass powder was obtained in a manner equivalent to that in Example 15B except that the holding temperature in the second heating stage was 1,120° C.

The content of silanol groups in the quartz glass powder thus obtained was measured by an infrared absorption spectroscope, and the measurement result was 33 ppm.

The content of silanol groups in a sample formed by melting this quartz glass powder at a normal pressure was 37 ppm, the viscosity thereof at 1,400° C. was $3.3 \times 10^{10}$ poise, and both properties were superior.

EXAMPLE 22B

A quartz glass powder was obtained in a manner equivalent to that in Example 15B except that the holding temperature in the second heating stage was 1,270° C.

The content of silanol groups in the quartz glass powder thus obtained was measured by an infrared absorption spectroscope, and the measurement result was 38 ppm.

The content of silanol groups in a sample formed by melting this quartz glass powder at a normal pressure was 37 ppm, the viscosity thereof at 1,400° C. was $3.3 \times 10^{10}$ poise, and both properties were superior.

EXAMPLE 23B

A quartz glass powder was obtained in a manner equivalent to that in Example 15B except that the holding time in the first heating stage was 7 hours.

The content of silanol groups in the quartz glass powder thus obtained was measured by an infrared absorption spectroscope, and the measurement result was 32 ppm.

The content of silanol groups in a sample formed by melting this quartz glass powder at a normal pressure was 35 ppm, the viscosity thereof at 1,400° C. was $3.3 \times 10^{10}$ poise, and both properties were superior.

EXAMPLE 24B

A quartz glass powder was obtained in a manner equivalent to that in Example 15B except that the holding time in the second heating stage was 2 hours.

The content of silanol groups in the quartz glass powder thus obtained was measured by an infrared absorption spectroscope, and the measurement result was 36 ppm.

The content of silanol groups in a sample formed by melting this quartz glass powder at a normal pressure was 35 ppm, the viscosity thereof at 1,400° C. was $3.3 \times 10^{10}$ poise, and both properties were superior.

EXAMPLE 25B

A quartz glass powder was obtained in a manner equivalent to that in Example 15B except that the degree of reduced pressure was 33.3 kPa.

The content of silanol groups in the quartz glass powder thus obtained was measured by an infrared absorption spectroscope, and the measurement result was 30 ppm.

The content of silanol groups in a sample formed by melting this quartz glass powder at a normal pressure was 32 ppm, the viscosity thereof at 1,400° C. was $3.3 \times 10^{10}$ poise, and both properties were superior.

COMPARATIVE EXAMPLE 1B

A quartz glass powder was obtained in a manner equivalent to that in Example 1B except that the first heating stage was omitted, and the temperature was increased from room temperature to 600° C. and was then maintained for 9 hours.

The content of silanol groups in the quartz glass powder thus obtained was 107 ppm.

The content of silanol groups in a sample formed by melting this quartz glass powder at a normal pressure was 105 ppm, and the viscosity thereof at 1,400° C. was $3.1 \times 10^{10}$ poise.

COMPARATIVE EXAMPLE 2B

A quartz glass powder was obtained in a manner equivalent to that in Example 15B except that the first heating stage was omitted, and the temperature was increased from room temperature to 1,200° C. and was then maintained for 20 hours.

The content of silanol groups in the quartz glass powder thus obtained was 132 ppm.

The content of silanol groups in a sample formed by melting this quartz glass powder at a normal pressure was 133 ppm, and the viscosity thereof at 1,400° C. was $2.9 \times 10^{10}$ poise.

INDUSTRIAL APPLICABILITY

As has thus been described, according to the first and the second inventions, a hydrous silica gel can be dehydrated in a manner suitably applied to industrial uses in view of energy cost, and a high-purity synthetic quartz glass powder can be produced in a manner uses applied to industrial uses in view of energy cost. Accordingly, the synthetic quartz glass powder obtained by the present invention can be effectively used as a raw material for forming heat treatment members for semiconductors, crucibles for pulling semiconductor single crystals, optical members, and the like.

In addition, according to the third invention, even when an inexpensive water glass is used as a raw material, a high-purity synthetic quartz powder containing an extremely small amount of titanium can be obtained.

Furthermore, according to the fourth and the fifth inventions, a high-purity synthetic quartz glass containing an extremely small amount of silanol groups can be obtained.

The invention claimed is:

1. A method for preparing silica particles by dehydrating a hydrous silica gel comprising the sequential steps of:
   i.) freezing the hydrous silica gel;
   ii.) thawing the frozen hydrous silica gel; and
   iii.) removing water which is separated by thawing so as to obtain silica particles,
   wherein, in at least one of these steps, from 50 ppm to 5 weight-% of hydrogen peroxide with respect to $SiO_2$ in the hydrous silica gel or silica particles is used.

2. A method for producing a synthetic quartz glass powder comprising the sequential steps of:
   i.) freezing a hydrous silica gel;
   ii.) thawing the frozen hydrous silica gel;
   iii.) removing water which is separated by thawing so as to obtain silica particles;
   iv.) washing the silica particles; and
   v.) firing the washed silica to produce the synthetic quartz glass powder, -p1 wherein, in at least one of steps i.) to iv.), from 50 ppm to 5 weight-% of hydrogen peroxide with respect to $SiO_2$ in the hydrous silica gel or silica particles is used.

3. A method for producing a synthetic quartz glass powder according to claim 2, comprising a preliminary step of gelating a water glass or an aqueous silica solution which is obtained by separating an alkaline component from a water glass, using from 50 ppm to 5 weight-% of hydrogen peroxide with respect to $SiO_2$ in the water glass or aqueous silica.

* * * * *